US012130145B2

(12) United States Patent
Ostrowski et al.

(10) Patent No.: US 12,130,145 B2
(45) Date of Patent: Oct. 29, 2024

(54) GROUP-BASED NAVIGATION (71) Applicant: Ford Global Technologies, LLC, Dearborn, MI (US)

(72) Inventors: David Alfred Ostrowski, Northville, MI (US); Leopoldo Urbina, Álvaro Obregón/Ciudad de Mexico (MX); Elizabeth Anne Manwell, Canton, MI (US); Akshay Dirisala, Olmsted Township, OH (US); Sakthish R. Sathasivam, Ann Arbor, MI (US); Austin Kirchner, Denver, CO (US)

(73) Assignee: Ford Global Technologies, LLC, Dearborn, MI (US)

( * ) Notice: Subject to any disclaimer, the term of this patent is extended or adjusted under 35 U.S.C. 154(b) by 361 days.

(21) Appl. No.: 17/712,432

(22) Filed: Apr. 4, 2022

(65) Prior Publication Data
US 2023/0314145 A1    Oct. 5, 2023

(51) Int. Cl.
*G01C 21/34* (2006.01)
*H04W 64/00* (2009.01)

(52) U.S. Cl.
CPC ....... *G01C 21/343* (2013.01); *G01C 21/3484* (2013.01); *H04W 64/00* (2013.01)

(58) Field of Classification Search
CPC .............. G01C 21/343; G01C 21/3484; G01C 21/3617; H04W 64/00
See application file for complete search history.

(56) References Cited

U.S. PATENT DOCUMENTS

| 7,640,104 B2 | 12/2009 | Ramaswamy et al. |
| 8,396,659 B2 | 3/2013 | Ando et al. |
| 8,781,730 B2 | 7/2014 | Downey et al. |
| 8,949,028 B1 | 2/2015 | Klampfl et al. |
| 10,060,756 B2 | 8/2018 | Hansen et al. |
| 10,445,601 B2 | 10/2019 | Herman et al. |
| 10,956,855 B1 | 3/2021 | Coughran et al. |

(Continued)

FOREIGN PATENT DOCUMENTS

| CN | 102037324 B | 5/2015 |
| DE | 102015114806 A1 | 3/2016 |

(Continued)

OTHER PUBLICATIONS

Hartmann et al., "Antenna pattern optimization for a RSSI-based Direction of Arrival (DoA) localization system", Conference Paper ■ Apr. 2015, https://www.researchgate.net/publication/308986627.

*Primary Examiner* — Keith D Bloomquist
(74) *Attorney, Agent, or Firm* — Christopher Storms; Bejin Bieneman PLC (57) ABSTRACT

A method and system for navigating a vehicle based upon data of a group includes automatically determining a specific group identity for an operator and one or more occupants of a vehicle by digitally identifying the operator and the one or more occupants of the vehicle based upon Received Signal Strength Indication (RSSI) of a wireless network with multiple antennas in the vehicle to estimate localization of wireless devices of the operator and the one or more occupants, evaluating parameters associated with the specific group identity, and determining a path for the vehicle based upon the specific group identity.

18 Claims, 6 Drawing Sheets

(56) References Cited

U.S. PATENT DOCUMENTS

| | | | |
|---|---|---|---|
| 2007/0073480 A1* | 3/2007 | Singh | G08G 1/096805 |
| | | | 701/420 |
| 2009/0319172 A1* | 12/2009 | Almeida | G01C 21/3484 |
| | | | 726/4 |
| 2013/0013195 A1* | 1/2013 | Kritt | G01C 21/343 |
| | | | 701/439 |
| 2018/0051997 A1* | 2/2018 | Grochocki, Jr. | G01C 21/3415 |
| 2018/0144369 A1* | 5/2018 | Pouliot | B60W 30/0956 |
| 2019/0300006 A1* | 10/2019 | Golsch | B60W 50/0098 |
| 2019/0383628 A1 | 12/2019 | Quint et al. | |
| 2020/0269809 A1* | 8/2020 | Sanji | B60R 25/31 |
| 2022/0327919 A1* | 10/2022 | Gilbert | G01C 21/3415 |
| 2023/0206916 A1* | 6/2023 | Yae | G06Q 50/40 |
| | | | 704/235 |

FOREIGN PATENT DOCUMENTS

| | | |
|---|---|---|
| DE | 102016107712 A1 | 11/2016 |
| DE | 102016107713 A1 | 11/2016 |
| DE | 112017007882 T5 | 5/2020 |
| JP | 2005132291 A | 5/2005 |

\* cited by examiner

GROUP-BASED NAVIGATION

BACKGROUND

A vehicle may include a navigation system. The navigation system is implemented via circuits, chips, and/or other electronic components that can determine a present location of the vehicle. The navigation system may be implemented via a satellite-based system such as the Global Positioning System (GPS). The navigation system may triangulate the location of the vehicle based on signals received from various satellites in the Earth's orbit. The navigation system is programmed to output signals representing the present location of the vehicle, e.g., the computer via a vehicle communication network. In some instances, the navigation system is programmed to determine a route or path from the present location of the vehicle to a future location. The navigation system may access a map stored in memory and develop the path according to the map data. The map in any event may include data specifying lanes of roads of the map, e.g., including turn lanes, a direction of traffic flow for the lanes, a speed limit, etc.

DETAILED DESCRIPTION

A method and system for navigating a vehicle, including selecting a route or path for the vehicle, may be based upon data about all of the occupants of the vehicle. For example, when driving a carpool for work, the shortest path or the path that passes a waypoint associated with one or more of the occupants may be preferred. However, with a different group, a scenic path may be preferred. To identify the operator and occupants efficiently, the present disclosure automatically determines a group used for the navigation by digitally identifying the operator and the one or more occupants of the vehicle based their mobile devices using Received Signal Strength Indication (RSSI) to localize the operator and the one or more occupants based upon radio signals (e.g., WiFi signals) from their mobile devices. Various parameters associated with the group are evaluated, and a path is determined for the vehicle using machine learning that takes the data of the entire group into account.

In an implementation, a computing device has a processor and a memory, the memory storing instructions executable by the processor, with the instructions including instructions to automatically determine a specific group identity of an operator and one or more occupants of a vehicle by digitally identifying the operator and the one or more occupants of the vehicle based upon Received Signal Strength Indication (RSSI) of a wireless network with multiple antennas in the vehicle to estimate localization of wireless devices of the operator and the one or more occupants, evaluate parameters associated with the specific group identity, and determine a path for the vehicle based upon the specific group identity.

The instructions to determine a path may include instructions to determine alternative paths and waypoints.

One or more antennas may be disposed adjacent an entry zone of the operator and be used to digitally identify the operator.

The instructions to evaluate parameters associated with the specific group identity may include instructions to evaluate parameters of prior paths traveled by the specific group identity and/or individuals of the specific group identity, determine parameters of waypoints and/or destinations of the prior paths, evaluate parameters of navigational preferences of individuals of the specific group identity, correlate the parameters associated with the specific group identity, and weight the parameters based upon correlation.

The instructions to determine a path may include instructions to receive input of a destination.

The instructions to determine a path may include instructions to determine updated comparative paths based on the specific group identity in response to detecting a variance from a selected path.

The instructions to determine a path may include instructions to generate a predicted path in response to not receiving input of a destination.

The instructions to determine a path may include instructions to receive input of a destination or predict a destination, determine any sub-destinations, generate a plurality of permutations of paths between each sub-destination, construct a full path to the destination for each permutation, evaluate the full paths with a neural network, and determine a path and an alternative path.

The instructions to determine the path and the alternative path may include instructions to update the path and the alternative path while proceeding to the destination.

The instructions to evaluate parameters associated with the specific group identity may further include instructions to evaluate parameters associated with a peer group of the specific group identity, the peer group determined based upon correlated parameters.

The parameters may include time of day, day of week, season, date, number of intermediate destinations, proximity to desirable locations, trip length, travel time, travel speed, fueling intervals, vehicle maintenance intervals, sub-paths taken, paths taken, road characteristics, health conditions of the operator and occupants of the specific group identity, and aggregate metrics characterizing emotion, anxiety, and fatigue of the operator and occupants of the specific group identity.

The parameters may further include tokens related to taking a specific sub-path.

In another implementation, a method includes automatically determining a specific group identity for an operator and one or more occupants of a vehicle by digitally identifying the operator and the one or more occupants of the vehicle based upon Received Signal Strength Indication (RSSI) of a wireless network with multiple antennas in the vehicle to estimate localization of wireless devices of the operator and the one or more occupants, evaluating parameters associated with the specific group identity, and determining a path for the vehicle based upon the specific group identity.

Evaluating parameters associated with the specific group identity may include evaluating parameters of prior paths traveled by the specific group identity and/or individuals of the specific group identity, determining parameters of waypoints and/or destinations of the prior paths, evaluating parameters of navigational preferences of individuals of the specific group identity, correlating the parameters associated with the specific group identity, and weighting the parameters based upon correlation.

Determining a path may include receiving input of a destination or predicting a destination, determining any sub-destinations, generating a plurality of permutations of paths between each sub-destination, constructing a full path to the destination for each permutation, evaluating the full paths with a neural network, and determining a path and an alternative path.

Determining the path and the alternative path may include updating the path and the alternative path while proceeding to the destination.

Determining a path may include determining updated comparative paths based on the specific group identity in response to detecting a variance from a selected path.

Evaluating parameters associated with the specific group identity may further include evaluating parameters associated with a peer group of the specific group identity, the peer group determined based upon correlated parameters.

The parameters may include time of day, day of week, season, date, number of intermediate destinations, proximity to desirable locations, trip length, travel time, travel speed, fueling intervals, vehicle maintenance intervals, sub-paths taken, paths taken, road characteristics, health conditions of the operator and occupants of the specific group identity, and aggregate metrics characterizing emotion, anxiety, and fatigue of the operator and occupants of the specific group identity.

The parameters may further include tokens related to taking a specific sub-path.

Figure 1:
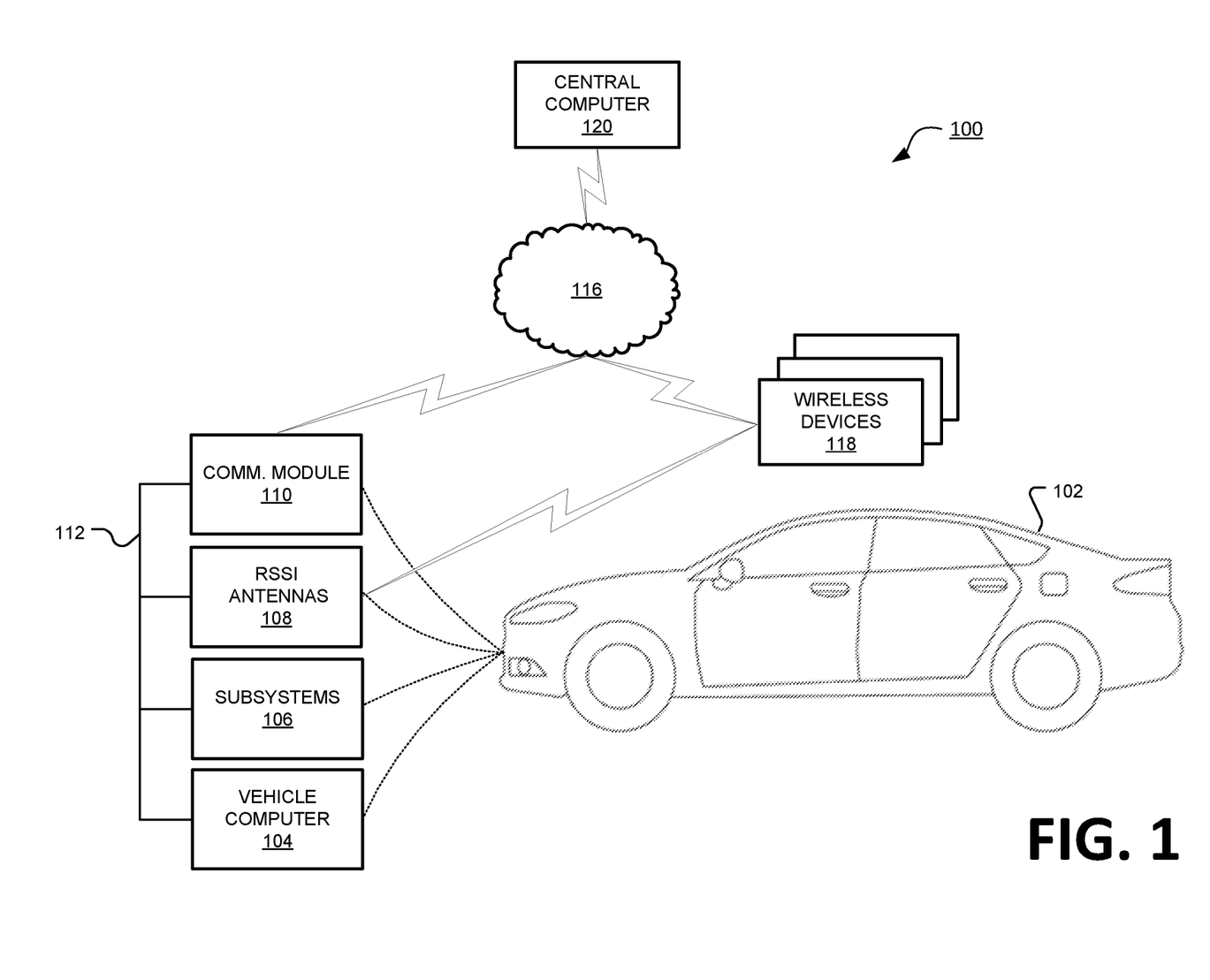
FIG. 1 is a diagram of an example vehicle including antennas for collecting Received Signal Strength Indication (RSSI) signals.

With reference to FIG. 1, a system 100 can provide communications between vehicle 102 and one or more mobile devices 118, and a central computer 120 to provide navigation services, such as to an operator of the vehicle 102. The mobile devices 118 can communicate directly or indirectly with vehicle 102 over a wireless network having wireless antennas, herein referred to as RSSI antennas 108. The navigation services can be provided based on one or more associations of users, including the operator and one or more additional occupants present in the vehicle. Providing navigation services as disclosed herein, e.g., planning a route including one or more waypoints, can provide for more efficient operation of a vehicle.

A vehicle 102 is a set of components or parts, including hardware components and typically also software and/or programming, to perform a function or set of operations to operate the vehicle 102. Vehicle subsystems 106 comprising vehicle components typically include a braking system, a propulsion system, and a steering system as well as tertiary subsystems including but not limited to a safety system, a navigation system, a climate control system, a lighting system, and an infotainment system. The propulsion subsystem converts energy to rotation of vehicle 102 wheels to propel the vehicle 102 forward and/or backward. The braking subsystem can slow and/or stop vehicle 102 movement. The steering subsystem can control a yaw, e.g., turning left and right, maintaining a straight path, of the vehicle 102 as it moves.

Computers, including the herein-discussed vehicle computer 104, wireless devices 118, and central computer 120, include respective processors and memories. A computer memory can include one or more forms of computer readable media, and stores instructions executable by a processor for performing various operations, including as disclosed herein. For example, the computer can be a generic computer with a processor and memory as described above and/or a vehicle computer 104, for example, may include an electronic control unit (ECU), controller, or the like for a specific function or set of functions, and/or a dedicated electronic circuit including an ASIC that is manufactured for a particular operation, e.g., an ASIC for processing sensor data and/or communicating the sensor data. In another example, computer may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer.

A computer memory can be of any suitable type, e.g., hard disk drives, solid state drives, servers, or any volatile or non-volatile media. The memory can store data, e.g., a memory of a vehicle computer 104 can store data sent from RSSI antennas 108. The memory can be a separate device from the computer, and the computer can retrieve information stored in the memory, e.g., a vehicle computer 104 can obtain data to be stored via a vehicle network 112 in the vehicle 102, e.g., over a CAN bus, a wireless network, etc. Alternatively, or additionally, the memory can be part of the computer, i.e., as a memory of the computer.

The vehicle computer 104 can be included in a vehicle 102 that may be any suitable type of ground vehicle 102, e.g., a passenger or commercial automobile such as a sedan, a coupe, a truck, a sport utility, a crossover, a van, a minivan, etc. A vehicle computer 104 may include programming to operate one or more of vehicle 102 brakes, propulsion (e.g., control of acceleration in the vehicle 102 by controlling one or more of an internal combustion engine, electric motor, hybrid engine, etc.), steering, climate control, interior and/or exterior lights, etc., as well as to determine whether and when the computer, as opposed to a human operator, is to control such operations. Additionally, a vehicle computer 104 may be programmed to determine whether and when a human operator is to control such operations.

A vehicle computer 104 may include or be communicatively coupled to, e.g., via a vehicle network 112 such as a communications bus as described further below, more than one processor, e.g., included in components such as RSSI antennas 108, electronic controller units (ECUs) or the like included in the vehicle 102 for monitoring and/or controlling various vehicle components, e.g., a powertrain controller, a brake controller, a steering controller, etc. The computer is generally arranged for communications on a vehicle 102 communication network that can include a bus in the vehicle 102 such as a controller area network (CAN) or the like, and/or other wired and/or wireless mechanisms. Alternatively, or additionally, in cases where the computer actually comprises a plurality of devices, the vehicle 102 communication network may be used for communications between devices represented as the computer in this disclosure.

Vehicles 102 in accordance with the present disclosure include a plurality of RSSI antennas 108 that may communicate with wireless devices 118 in the possession of the vehicle operator and the vehicle occupants. The wireless devices 118 may include, but are not limited to, mobile phones, tablets, smart watches, fitness trackers, earbuds, and the like. In wireless communications, a Received Signal Strength Indicator (RSSI) is a measurement of the power present in a received radio signal. In an IEEE 802.11 system such as various flavors of W-Fi, RSSI is the relative received signal strength in a wireless environment, in arbitrary units. RSSI is an indication of the power level being received by the receiving radio after any antenna and possible cable loss and, by using multiple antennas, triangulation, and machine learning, an estimated localization can be determined for the wireless devices 118 and used as a proxy for the location of the operator or occupant (passenger) of the vehicle. For example, RSSI antennas 108 disposed adjacent an entry point of an operator, i.e., the driver's door, may be used to localize a wireless device 118 of the operator based upon a received signal strength for transmissions at these RSSI antennas 108 from the wireless device 118 of the operator as compared to wireless devices 118 of other occupants when the driver's door is opened.

The vehicle network 112 is a network via which messages can be exchanged between various devices in vehicle 102. The vehicle computer 104 can be generally programmed to send and/or receive, via vehicle network 112, messages to and/or from other devices in vehicle 102 e.g., any or all of ECUs, sensors, actuators, components, communications module, a human machine interface HMI, etc. Additionally, or alternatively, messages can be exchanged among various such other devices in vehicle 102 via a vehicle network 112. In cases in which the computer includes a plurality of devices, vehicle network 112 may be used for communications between devices represented as a computer in this disclosure. Further, as mentioned below, various controllers and/or RSSI antennas 108 may provide data to the computer. In some implementations, vehicle network 112 can be a network in which messages are conveyed via a vehicle 102 communications bus. For example, vehicle network 112 can include a controller area network (CAN) in which messages are conveyed via a CAN bus, or a local interconnect network (LIN) in which messages are conveyed via a LIN bus. In some implementations, vehicle network 112 can include a network in which messages are conveyed using other wired communication technologies and/or wireless communication technologies e.g., Ethernet, WiFi, Bluetooth, Ultra-Wide Band (UWB), etc. Additional examples of protocols that may be used for communications over vehicle network 112 in some implementations include, without limitation, Media Oriented System Transport (MOST), Time-Triggered Protocol TTP, and FlexRay. In some implementations, vehicle network 112 can represent a combination of multiple networks, possibly of different types, that support communications among devices in vehicle 102. For example, vehicle network 112 can include a CAN in which some devices in vehicle 102 communicate via a CAN bus, and a wired or wireless local area network in which some device in vehicle 102 communicate according to Ethernet or WI-FI communication protocols.

The vehicle computer 104, mobile devices 118, and/or central computer 120 can communicate via a wide area network 116. Further, various computing devices discussed herein may communicate with each other directly, e.g., via direct radio frequency communications according to protocols such as Bluetooth or the like. For example, a vehicle 102 can include a communication module 110 to provide communications with devices and/or networks not included as part of the vehicle 102, such as the wide area network 116 and/or a portable computer 118, for example. The communication module 110 can provide various communications, e.g., vehicle to vehicle (V2V), vehicle-to-infrastructure or everything (V2X) or vehicle-to-everything including cellular communications (C-V2X) wireless communications cellular, dedicated short range communications (DSRC), etc., to another vehicle 102, to an infrastructure element typically via direct radio frequency communications and/or typically via the wide area network 116, e.g., to the central computer 120. The communication module 110 could include one or more mechanisms by which a vehicle computer 104 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, DSRC, cellular V2X, CV2X, and the like.

The mobile devices 118 may use any suitable wireless communications, such as cellular or WI-FI, such as to communicate with the central computer 120 via the wide area network 116.

Figure 2:
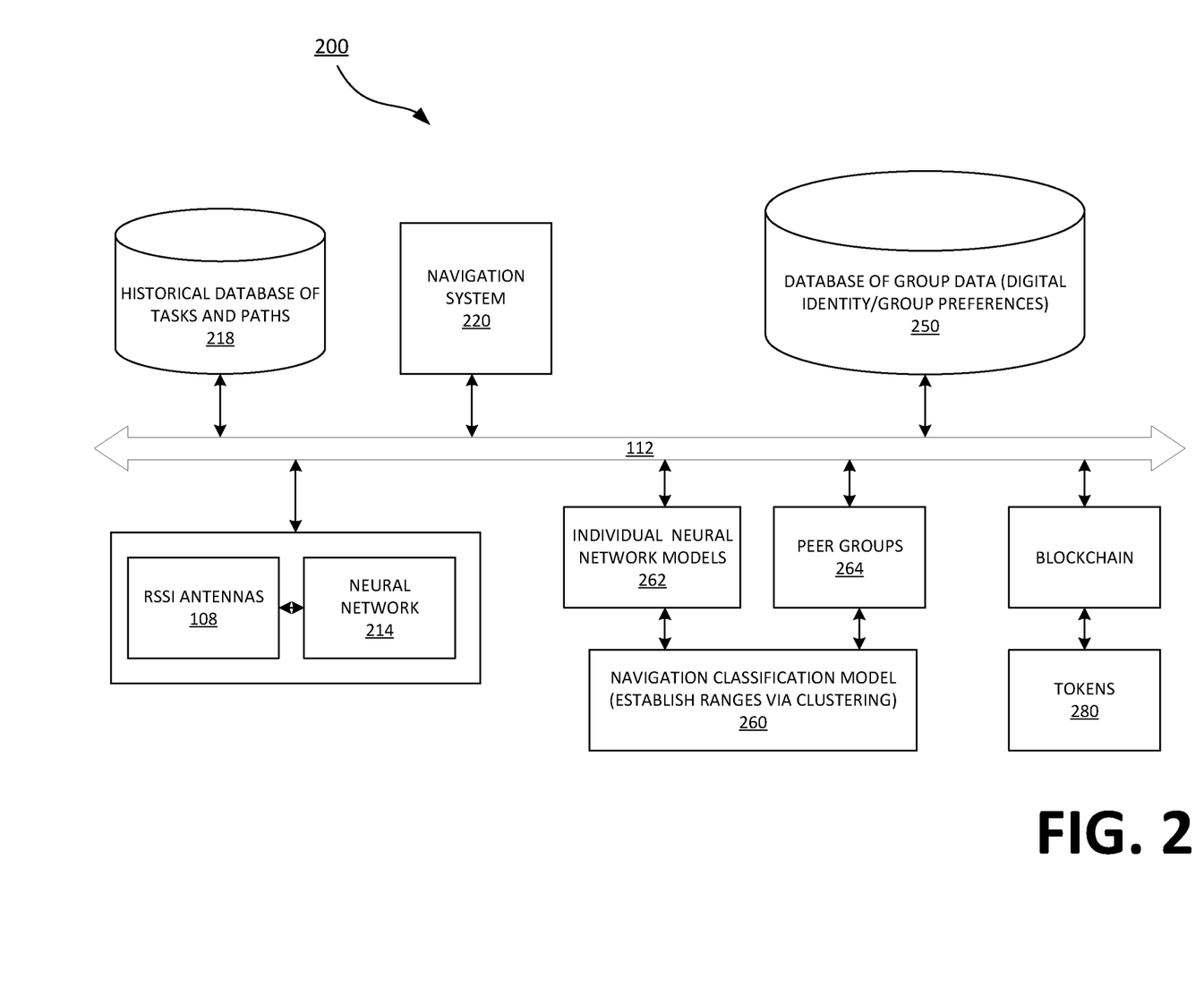
FIG. 2 is a diagram of an example navigation system for a vehicle.

With reference to FIG. 2, a group-based navigation subsystem 200 is illustrated. The subsystem 200 includes a navigation system 220 that is connected to the vehicle network 112 and that can provide conventional navigation output, e.g., a plan for a route or path, based on stored data in the form of maps, road attributes, and other navigation data. The navigation system 220 may also receive input from and provide output to a display, touchscreen, buttons, knobs, etc., that are included in a vehicle HMI. The navigation system 220 may be one of subsystems 106 of the vehicle 102 and/or may be cloud-based, e.g., provided from one or more central computers 120.

In an implementation to provide group-based navigation, a network of antennas in vehicle 102, referred to as RSSI antennas 108, is used to digitally identify an operator of the vehicle 102 and the passengers of the vehicle 102. In an example, RSSI antennas 108 may have a topology arranged to provide data about signals received from mobile devices 118 to localize zones in a vehicle 102, such as an operator seat, a passenger front seat, etc. A zone of an operator and any other occupant can then be identified from one or more received RSSI signals, e.g., by providing the RSSI signals to a trained neural network 214. For example, the neural network 214 could be trained to provide a first localization model that identifies an operator's point of entry to the vehicle, and then positions of other occupants, if any, using the RSSI data from mobile devices 118 as acquired by RSSI antennas 108. That is, the neural network 214 can be trained to first identify the operator of the vehicle 102 based on at least one mobile device 118 detected at an operator's point of entry, and to then identify remaining occupants from other points of entry using the RSSI data from one or more respective mobile devices 118. In other words, a digital identity for an occupant is typically identified by a device identifier provided from an occupant's mobile device(s) 118, and the occupant's position or location in a vehicle 102 can also be identified or determined from RSSI data input to a neural network 214 that outputs a position associated with a respective mobile device or devices 118 based on input of associated RSSI signals. An operator or occupant may have more than one mobile device 118, such as a mobile phone and a smartwatch or fitness tracker, and any or all of the mobile devices 118 may be used for digital identification. The localization using RSSI antennas 108 may be performed using any suitable technique, e.g., as disclosed in U.S.

Published Patent Application No. 2023/0179508A1 published Jun. 8, 2023 (application Ser. No. 17/543,048), or as disclosed in Hartmann et al., "Antenna pattern optimization for a RSSI-based Direction of Arrival (DoA) localization system", Proceedings of the ION 2015 Pacific PNT Meeting (pp. 429-433) (2015 April).

Based upon these identifications or digital identities of at least two or more individuals taking a trip in vehicle 102, a specific group digital identity (hereinafter "Group ID") may be identified for the two or more individuals from a database 250 of group and individual classifications, or may be established and stored in the database 250. A Group ID, in other words, is a unique combination of two or more individuals, and can be denoted by a unique identifier for the two or more individuals. In a case where a vehicle 102 includes two or more occupants but one or more of the occupants cannot be digitally identified, a new Group ID may be established or an existing Group ID can be selected, e.g., based on an association with one or more occupants who can be digitally identified. The neural network 214 may be disposed in the vehicle 102, for example, as programming in a vehicle computer 104, or may be cloud-based and disposed, for example, on a central computer 120.

With respect to Group IDs, on-line information may be integrated with Group IDs in database 250 in order to support determination of parameters related to additional preference data (weighted by the occupants) in support of determining alternative sub-destinations and paths. Such additional data sources include, but are not limited to social media, prior demonstrated behaviors in other groupings as well as associations to "peer groups" that have highly correlated feature sets with respect to the Group ID, for example, different Group IDs that share sets of parameters that are highly correlated, i.e., with a correlation coefficient closest to 1. Accordingly, a "peer group" of a first group in the context of this document is a second group that is identified has having highly correlated parameters with the first group. For example, the database 250 could store, for the first Group ID, a list or set of one or more second Group IDs that identify peer groups of the first Group ID.

This user grouping to determine a peer group may be accomplished, for example, through application of a collaborative filtering algorithm using clustering, wherein each driver (operator) may be identified with two separate peer groups. For example, data may be collected for each Group ID (operator/occupants) and clustered at multiple peer levels. The data may be stored as a vector, to which a k-means clustering algorithm may be applied to establish initial categories. In an implementation, a first peer level may cluster Group IDs based upon travel goals (including but not limited to saving fuel, travel time, comfort, commerce, tasks, etc.) that may closely mirror the encoding discussed in FIG. 6. A second peer level may cluster Group IDs by the number of passengers (i.e., operator/occupants), number of passengers in each row, age of passengers, and sex of passengers. A third peer level may cluster Group IDs by make, model, powertrain, and year of the vehicle. A fourth peer level may cluster Group IDs by various other factors, including but not limited to a ratio of city/highway driving, average city speed, average highway speed, standard deviation of city speed, standard deviation of highway speed, average accelerator pedal position, standard deviation of accelerator pedal position, average trip length, standard deviation of trip length, proximity of trip locations (start, end), brake score, and percentages of driving time for: EV on/off; eAssist; regeneration; eLaunch; coasting (no acceleration); creeping (5 mph or less); and coasting with brakes.

The clustered records from the multiple peer levels may be used to establish group configuration categories and may be applied to train a neural network to establish categories of drivers (operators) that will support classification of new drivers in a new Group ID. However, a new driver will typically only be evaluated to the first peer level until a sufficient amount of data are collected to support characterization at a second or higher peer level.

The database 250 of group data is connected to the vehicle network 112 and includes identifiers of various users and group data of the various Group IDs, e.g., indicating preferred waypoints, travel styles (e.g., prefers limited access highways over surface roads, prefers scenery over shortest path, prefers fuel-saving over shortest path, etc.), scheduling constraints, etc. This data provides parameters for a group, as discussed below. The database 250 may be cloud-based and disposed, for example, on a central computer 120. Alternatively or additionally, the database 250, or portions thereof pertaining to specific users, could be stored by a vehicle computer 104. A characterization of a user's digital identity may include a table or the like with a user identifier in the form of a digital identity, which may be anonymized for privacy purposes, a list of characteristics, rankings of the characteristics on a scale (e.g., 1 to 10), and a list of frequented locations. Similarly, a group characterization may include a table or the like with a Group ID, which may be anonymized for privacy purposes, a list of characteristics, rankings of the characteristics on a scale (e.g., 1 to 10), and a list of frequented locations as determined by both the individuals and the group. This database 250 that is used for the group-based navigation may be accessed by a connected vehicle fleet, so that the system may be used in a vehicle-agnostic manner, such as through WAN 116 (e.g., the Internet) to connect to the vehicle network 112 via the communications module 110 of the vehicle 102 being used. This database may also be configured as accessed by a blockchain to allow distributed entities (e.g., using an "app") to access information about groups.

In an implementation to provide group-based navigation, a navigation classification model 260 may use a neural network to identify and rank potential paths, whether a destination is input or predicted, and may establish ranges via clustering. The classification model 260 may be trained, for example, based upon the metrics as encoded in to train a neural network in FIG. 6, with the dependent variable for the navigation classification model 260 being whether the current Group ID has chosen a given navigational path. For first time users, the model may rely on recommendations from other Group IDs that are associated through an n-ary parameter association (including vehicle type and demographics). Individual neural network models 262 may be established for each Group ID, and peer groups 264 may be established, as discussed above, based upon common sets of parameters. Automatic weighting of parameter set association may support dynamic peer group association, where highly correlated parameter sets will support the matching between peer groups (e.g., groups that value energy saving paths over multiple-stop trips will be compared to like-minded groupings for recommendations). The navigation classification model 260 and individual neural network models 262 resulting therefrom for each Group ID may be disposed in the vehicle 102, for example, as programming of the vehicle computer 104, or may be cloud-based and disposed, for example, on a central computer 120. The peer groups 264 may be cloud-based and disposed, for example, on a central computer 120.

A token-based system 280, managed in a blockchain, may be used, where each path offered/taken could also be influenced by tokens established by entities to reward a Group ID that chooses paths which include (sub or potential) destinations that involve engaging in ecommerce. Here, a separate token-based currency may be applied to manage automatic accumulation of rewards provided by commerce related activities. The token-based system may be supported by entities desiring the recording of consumer preferences in the context of an actual collection of people (Group ID), identifying situations which could be tracked on the blockchain when applied to a consumer purchase. The token-based system 280 may be cloud-based and disposed, for example, on a central computer 120.

Figure 3:
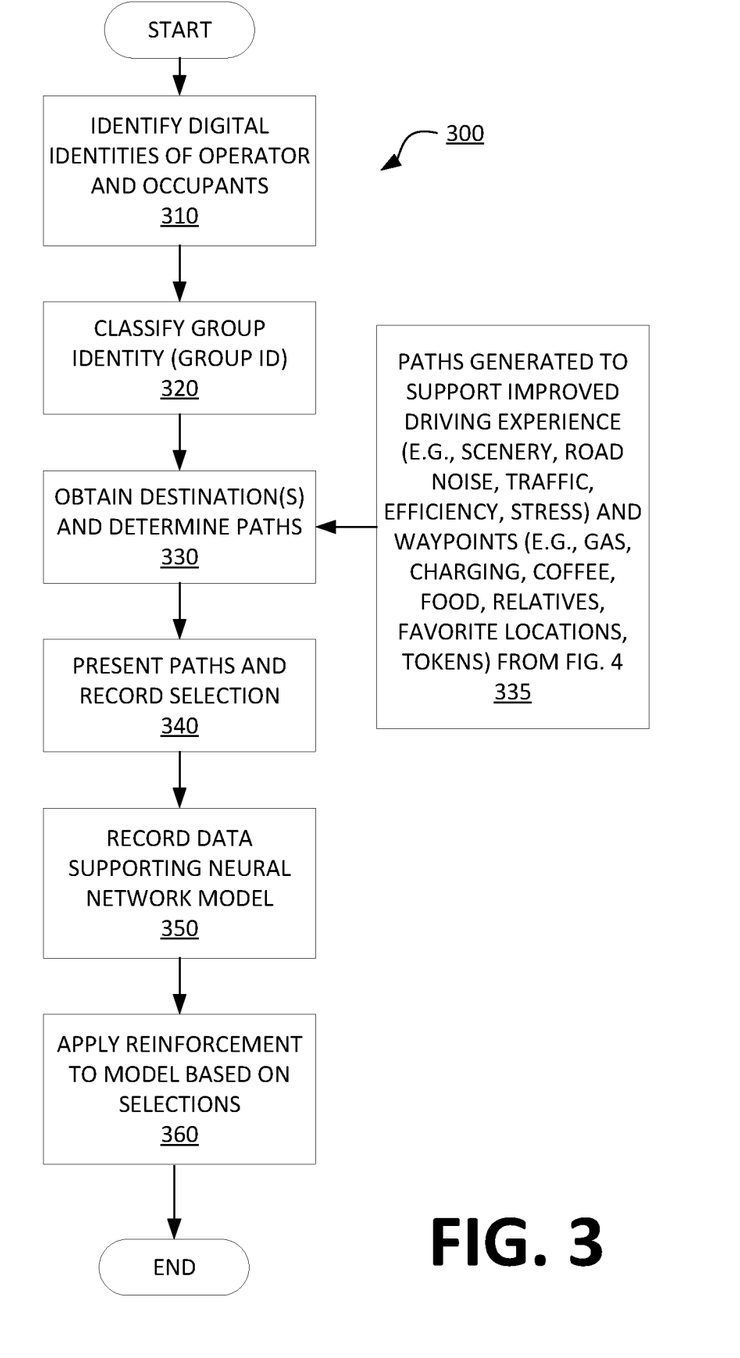
FIG. 3 is a flowchart diagram of an example process to operate a navigation system based on a group digital identity.

FIG. 3 is a flowchart diagram of an example process 300 to operate a vehicle 102 based on a group identity of occupants of the vehicle 102. The process 300 can be executed in a vehicle computer 104 according to stored program instructions.

The process 300 begins in a block 310, in which RSSI data from antennas at the vehicle 102 are input into the trained neural network 214 to identify digital identities of the operator and occupants of the vehicle 102 at the outset of a trip.

Next, in a block 320, the computer 104 accesses the database 250 and uses the digital identities to obtain (or create) a Group ID.

Figure 4:
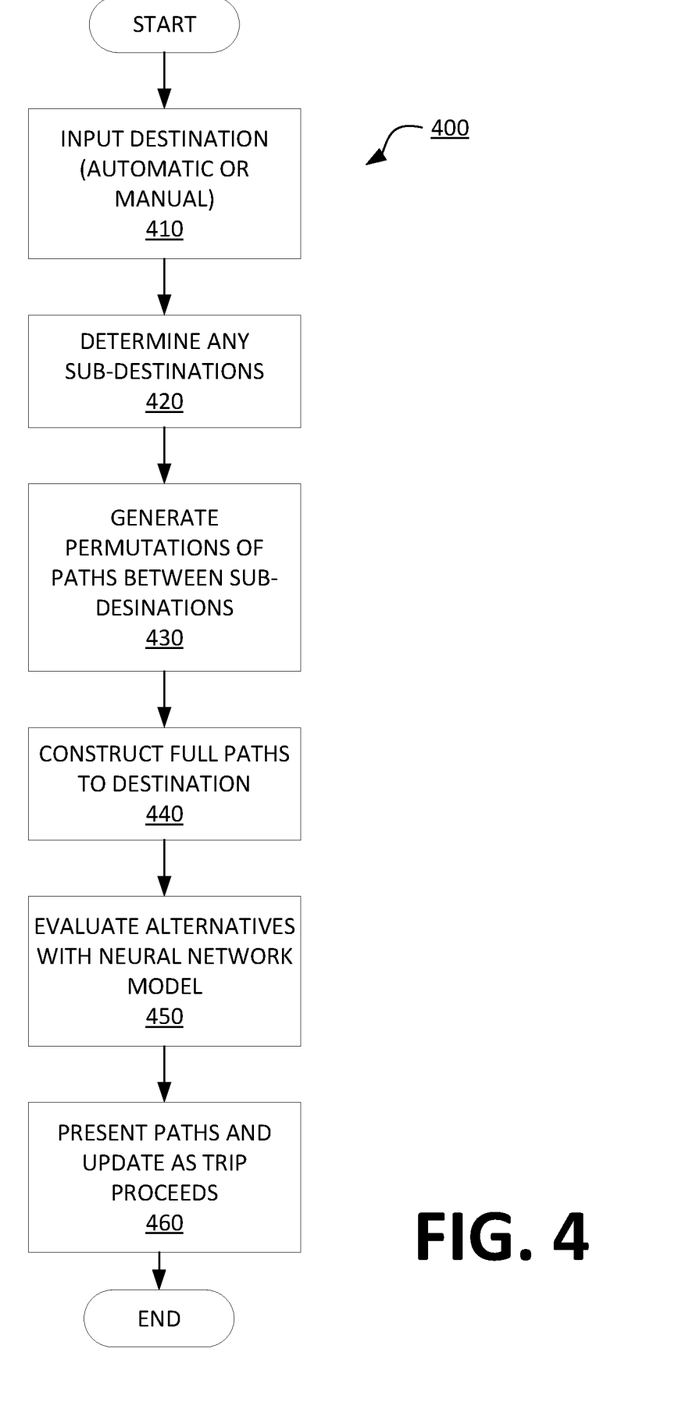
FIG. 4 is a flowchart diagram of an example process to determine paths using a group digital identity.

Next, in a block 330, the computer 104 obtains at least one destination and determines paths based upon the neural network model 262 for the Group ID. FIG. 4 provides details concerning how paths can be generated; as discussed below, the paths generated may support an improved driving experience for the group. For example, the paths may support preferred scenery, lower road noise, lower traffic, increased efficiency (fuel or battery), and/or lower stress. The paths generated may also support various desirable waypoints, including fuel, charging, coffee, food, relatives, favorite locations, and tokens.

Next, in a block 340, the computer 104 presents the paths (a path and at least one alternate path) in navigation system 220 and records the selection. The chosen path may be used as feedback, wherein, at block 350, data is recorded to support the neural network model 262, and at block 360, the computer 104 applies reinforcement to the neural network model 262 based upon the selections. The process 300 ends following the block 360.

FIG. 4 is a flowchart diagram of an example process 400 to determine paths for a vehicle 102 after a Group ID for occupants in the vehicle 102 has been determined. For example, the process 400 can be executed in a vehicle computer 104 as a sub-process of the process 300 described above.

The process 300 begins in a block 410, in which the computer 104 receives an input destination. This may be automatically defined/predicted, for example, based upon data in a user's calendar or upon data in a historical database 218 of tasks and paths (e.g., Tuesday evening trips to bowling league) or may be input by a vehicle 102 occupant to the navigation system 220.

Next, in a block 420, the process 400 determines any sub-destinations, i.e., waypoints at which the vehicle 102 may stop between a route or path origin and the destination specified in the block 410. Output from this block may produce a destination path and all (or all reasonable) variations of sub-destinations as evaluated from the logic to determine priorities, e.g., [Dest, sub-location_1, sub_location_2], [Dest, sub_location_2, sub_location_3], [Dest, sub_location_1, sub_location_3], etc.

Next, in a block 430, the computer 104 generates (all reasonable) permutations of paths between the sub-destinations.

Next, in a block 440, the computer 104 or navigation system 220 constructs (all reasonable) full paths to the destination. The full paths may be constructed using any suitable pathfinding algorithm.

At block 450, the computer 104 evaluates the alternatives of the full paths with the neural network model 262, which may perform prediction based upon established parameters of the Group ID or peer group.

Next, at a block 460, the computer 104 outputs paths (e.g., a path and at least one alternative) to the navigation system 220 and updates these paths as the trip proceeds. Alternative destinations and sub-destinations presented along the trip may be influenced by correlation of parameter sets to the highest estimated performance of the neural network model 262.

Figure 5:
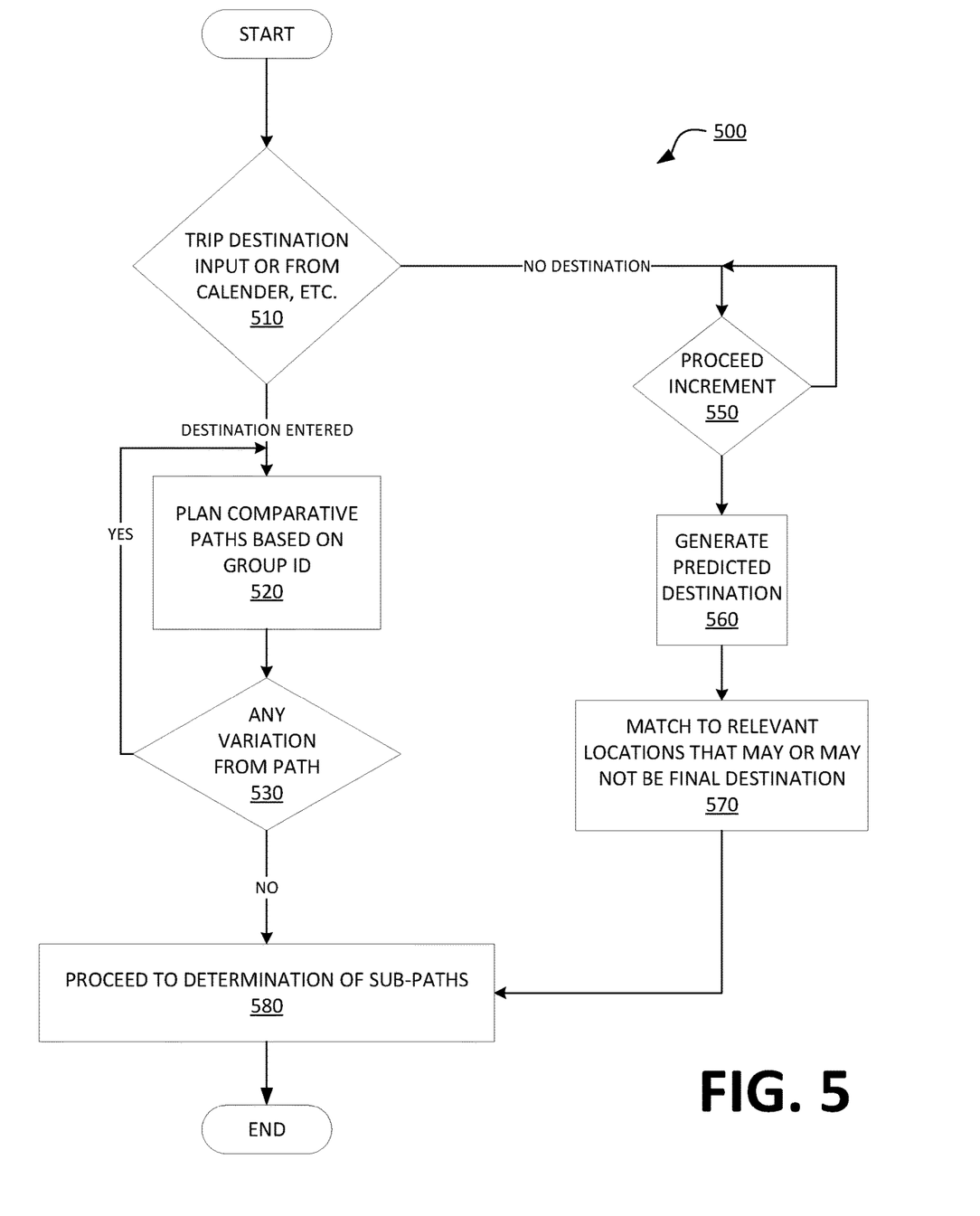
FIG. 5 is a flowchart diagram of an example process using either an input destination or a predicted destination.

FIG. 5 is a flowchart diagram of an example process 500 for performing group-based navigation using either an input destination or a predicted destination based upon group determined in process 300 and the paths determined in process 400. At block 510, the process 500 determines whether a trip destination is input or received from another source, such as a calendar of a mobile device 118. If a destination is entered, the process 500 plans out comparative paths based on the Group ID (determined in process 300) at block 520, such as by using process 400. At block 530, the process 500 determines if there has been any variation from the path, i.e., a variance. This may be provided by the navigation system 220. If there has been a variance, the process 500 returns to block 520 to plan out new comparative paths based on the Group ID. If no variance from the path is detected, the process 500 proceeds to a determination of sub-paths at block 580.

If it is determined that a destination has not been input (i.e., no destination), the process 500 proceeds for an increment (e.g., ¼ mile) and, at the end of each increment, generates a predicted destination at block 560, matches the prediction to relevant locations that may or may not be a final destination at block 570, and proceeds to a determination of sub-paths at block 580, such as by using process 400.

Training logic in support for path recommendations may include performing the following for trips detected based upon a key on-key off. After reaching a final destination, all paths are recorded, including those taken and those not taken. For each path, a ranking is applied to each stopping point, with high ranking for those on the chosen path and low ranking for those not on a chosen path. This information is stored in a trip characterization database and a destination (intermediate and final) characterization database based on category, interval, and importance/value.

Figure 6:
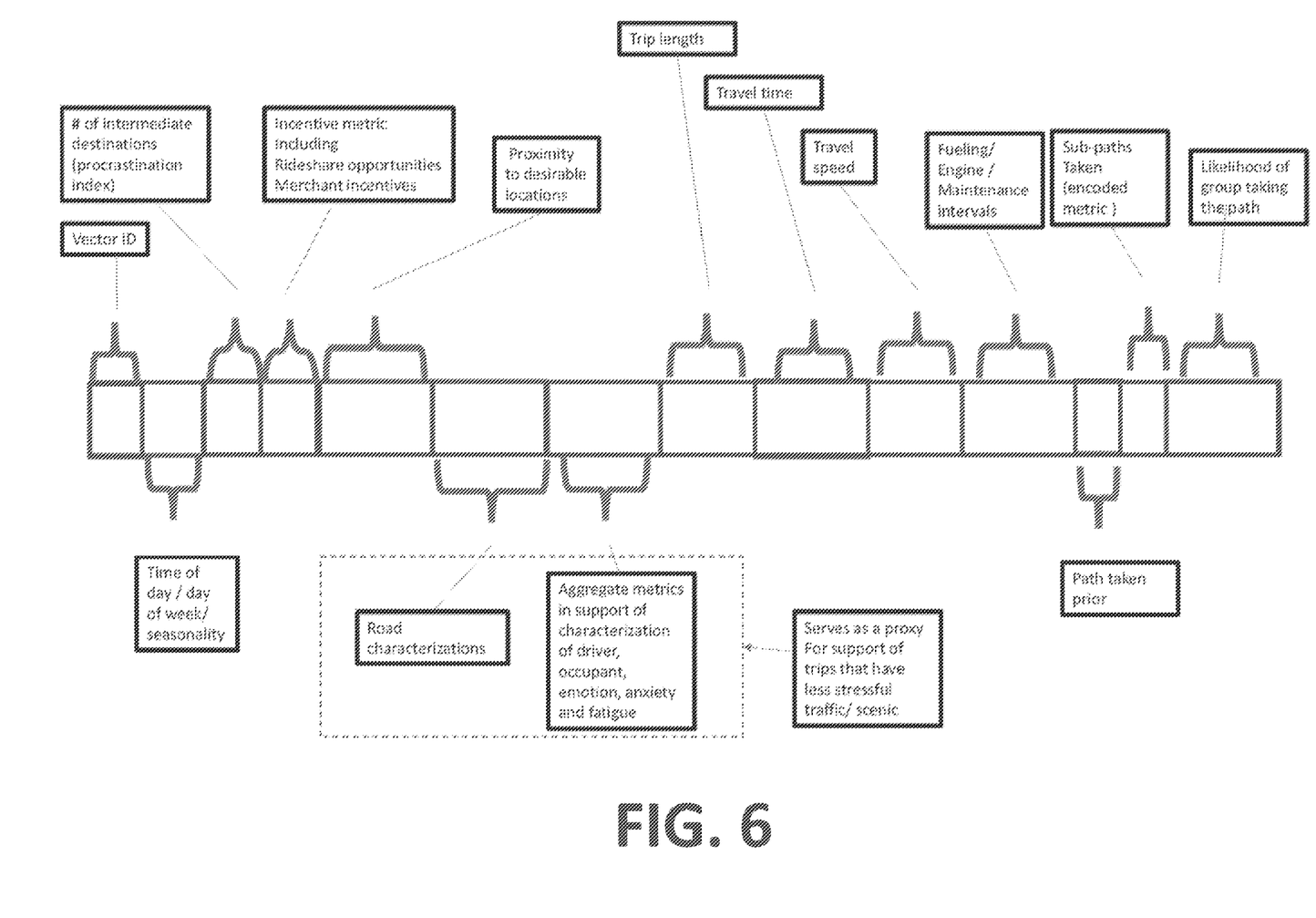
FIG. 6 is a diagram of data encoded for training a neural network.

As illustrated by the encoding of FIG. 6, parameters that may be used to influence the preferences/likelihood ranking of paths for a vector ID (i.e., destination) may include, but are not limited to: time (e.g., of day/week/month/seasonality); number of intermediate destinations; reward system tokens (e.g., cryptocurrency); proximity to desirable locations (e.g., Starbucks, fuel, charging stations); road characteristics (e.g., scenic); aggregate metrics in support of the characterization of driver/occupant anxiety, stress level, and fatigue; prior travel time; vehicle speed (including methods of speed/load prediction); fuel level; engine maintenance intervals; prior trips; and sub-paths taken.

Use of in response to, based on, and upon determining herein indicates a causal relationship, not merely a temporal relationship. Further, all terms used in the claims are intended to be given their plain and ordinary meanings as understood by those skilled in the art unless an explicit indication to the contrary is made herein. Use of the singular articles "a," "the," etc. should be read to recite one or more of the indicated elements unless a claim recites an explicit limitation to the contrary.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain implementations and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computing device comprising a processor and a memory, the memory storing instructions executable by the processor, the instructions including instructions to:
   automatically determine a specific group identity of an operator and one or more occupants of a vehicle by digitally identifying the operator and the one or more occupants of the vehicle based upon Received Signal Strength Indication (RSSI) of a wireless network with multiple antennas in the vehicle to estimate localization of wireless devices of the operator and the one or more occupants;
   evaluate parameters associated with the specific group identity, including evaluating parameters associated with a peer group of the specific group identity, the peer group determined based upon correlated parameters clustered at multiple peer levels, the peer levels including at least two of travel goals, passenger attributes, vehicle attributes, and driving data; and
   determine a path for the vehicle based upon evaluating the parameters associated with the specific group identity.

2. The computing device of claim 1, wherein the instructions to determine a path include instructions to determine alternative paths and waypoints.

3. The computing device of claim 1, wherein one or more antennas disposed adjacent an entry zone of the operator are used to digitally identify the operator.

4. The computing device of claim 1, wherein the instructions to evaluate parameters associated with the specific group identity includes instructions to:
   evaluate parameters of prior paths traveled by the specific group identity and/or individuals of the specific group identity;
   determine parameters of waypoints and/or destinations of the prior paths;
   evaluate parameters of navigational preferences of individuals of the specific group identity;
   correlate the parameters associated with the specific group identity; and
   weight the parameters based upon correlation.

5. The computing device of claim 1, wherein the instructions to determine a path include instructions to receive input of a destination.

6. The computing device of claim 5, wherein the instructions to determine a path include instructions to determine updated comparative paths based on the specific group identity in response to detecting a variance from a selected path.

7. The computing device of claim 1, wherein the instructions to determine a path include instructions to generate a predicted path in response to not receiving input of a destination.

8. The computing device of claim 1, wherein the instructions to determine a path include instructions to:
   receive input of a destination or predict a destination;
   determine any sub-destinations;
   generate a plurality of permutations of paths between each sub-destination;
   construct a full path to the destination for each permutation;
   evaluate the full paths with a neural network; and
   determine a path and an alternative path.

9. The computing device of claim 8, wherein the instructions to determine the path and the alternative path include instructions to update the path and the alternative path while proceeding to the destination.

10. The computing device of claim 4, wherein the parameters include time of day, day of week, season, date, number of intermediate destinations, proximity to desirable locations, trip length, travel time, travel speed, fueling intervals, vehicle maintenance intervals, sub-paths taken, paths taken, road characteristics, health conditions of the operator and occupants of the specific group identity, and aggregate metrics characterizing emotion, anxiety, and fatigue of the operator and occupants of the specific group identity.

11. The computing device of claim 10, wherein the parameters further include tokens related to taking a specific sub-path.

12. A method comprising:
   automatically determining a specific group identity for an operator and one or more occupants of a vehicle by digitally identifying the operator and the one or more occupants of the vehicle based upon Received Signal Strength Indication (RSSI) of a wireless network with multiple antennas in the vehicle to estimate localization of wireless devices of the operator and the one or more occupants;
   evaluating parameters associated with the specific group identity, including evaluating parameters associated with a peer group of the specific group identity, the peer group determined based upon correlated parameters clustered at multiple peer levels, the peer levels including at least two of travel goals, passenger attributes, vehicle attributes, and driving data; and
   determining a path for the vehicle based upon evaluating the parameters associated with the specific group identity.

13. The method of claim 12, wherein evaluating parameters associated with the specific group identity includes:
   evaluating parameters of prior paths traveled by the specific group identity and/or individuals of the specific group identity;

determining parameters of waypoints and/or destinations of the prior paths;

evaluating parameters of navigational preferences of individuals of the specific group identity;

correlating the parameters associated with the specific group identity; and weighting the parameters based upon correlation.

14. The method of claim 12, wherein determining a path includes:

receiving input of a destination or predicting a destination;

determining any sub-destinations;

generating a plurality of permutations of paths between each sub-destination;

constructing a full path to the destination for each permutation;

evaluating the full paths with a neural network; and determining a path and an alternative path.

15. The method of claim 14, wherein determining the path and the alternative path include updating the path and the alternative path while proceeding to the destination.

16. The method of claim 12, wherein determining a path includes determining updated comparative paths based on the specific group identity in response to detecting a variance from a selected path.

17. The method of claim 13, wherein the parameters include time of day, day of week, season, date, number of intermediate destinations, proximity to desirable locations, trip length, travel time, travel speed, fueling intervals, vehicle maintenance intervals, sub-paths taken, paths taken, road characteristics, health conditions of the operator and occupants of the specific group identity, and aggregate metrics characterizing emotion, anxiety, and fatigue of the operator and occupants of the specific group identity.

18. The method of claim 12, wherein the parameters further include tokens related to taking a specific sub-path.

* * * * *